United States Patent [19]

McDowell

[11] Patent Number: 5,160,013
[45] Date of Patent: Nov. 3, 1992

[54] AUTOMATIC BOTTLE-TURNING MACHINE AND METHOD

[75] Inventor: James E. McDowell, Orange City, Fla.

[73] Assignee: McDowell International Packaging Systems, Inc., Orlando, Fla.

[21] Appl. No.: 772,151

[22] Filed: Oct. 7, 1991

[51] Int. Cl.⁵ ............................................. B65G 47/24
[52] U.S. Cl. ...................................... 198/412; 193/45; 193/47; 198/409
[58] Field of Search ................ 198/409, 412; 193/45, 193/47

[56] References Cited

U.S. PATENT DOCUMENTS

| | | | |
|---|---|---|---|
| 1,869,639 | 8/1932 | Washburne | 198/409 |
| 3,759,366 | 9/1973 | Adank | 198/412 |
| 4,343,587 | 8/1982 | Aidlin et al. | 198/409 |
| 4,534,153 | 8/1985 | Nowicki | 198/412 |
| 5,074,103 | 12/1991 | McDowell | 53/495 |

Primary Examiner—Joseph E. Valenza
Attorney, Agent, or Firm—Oblon, Spivak, McClelland, Maier & Neustadt

[57] ABSTRACT

An automatic bottle-turning machine is described in which filled water bottles are conveyed through an automatic turning apparatus that rotates them from an upright position onto their sides, and discharges them. Bottles enter a turning station which is laterally rotatable about a longitudinal axis, and is blocked at its distal end by an exit stop. Bottles are counted as they enter. When a predetermined count number is reached, bottle entry is stopped and the station rotates 90 degrees from its initial position to a second position. The exit stop is then deactuated and the turned bottles discharge. Bottles are counted as they exit. When the predetermined count number is reached, the station rerotates from the second position to the initial position, and the exit stop is reactuated.

13 Claims, 3 Drawing Sheets

_5,160,013_

AUTOMATIC BOTTLE-TURNING MACHINE AND METHOD

BACKGROUND

Automatic bottle-turning apparatus exists for small bottles. Thus, upright small filled bottles may be conveyed through mechanical turn guides, which twist the bottles 90 degrees so that they are on their sides. This is done typically to facilitate loading the bottles into packages.

It is believed that no comparable practical, commercial apparatus has been devised for rotating upright large filled bottles, such as filled 5-gallon water bottles, onto their sides. However, it is necessary to turn such bottles onto their sides in order to load them into racks for storage and for transportation to customers.

Hand turning such bottles is awkward and involves substantial labor costs, as well as risk of back injuries. The inventor tried to adapt existing mechanical turn guides (used with small bottles, as described above) to this purpose for 5-gallon water bottles, but found the expedient unsatisfactory. Because of the great weight of the bottles (approximately 45 pounds), considerable force was needed to turn upright bottles onto their sides. It was possible to do this with a very long mechanical guide, through which bottles were automatically conveyed by a powered conveyor. But there were numerous problems. First, the bottles tended to twist (axially rotate) in the guide instead of turning over onto their sides. The guides had to be very long, with a gradual turn, to keep the bottles from simply jamming up in the turn guides. Space is at a premium in bottle loading plants, however, making such a long turn guide mechanism impracticable.

When such bottles were passed through the guide at a high throughput rate, in close proximity to one another, they particularly tended to interfere with one another and tilt out of proper alignment. That is, the axis of each bottle tended no longer to be perpendicular to the direction of travel of the bottle through the guide. The result was that the bottles slipped and piled up against each other.

In order to solve the problem of automatically turning these heavy bottles on their sides, which was necessary to permit the bottles to be automatically loaded into racks (for example, by the Automatic Bottle Loading Apparatus described in the inventor's copending patent application, Ser. No. 601,932 now U.S. Pat. No. 5,074,103), the inventor invented the invention described hereinbelow. It is believed that the invention described here is the first practical and compact commercial automatic bottle-turning machine for heavy bottles.

DRAWINGS

SUMMARY

An infeed conveyor delivers upright filled bottles to an automatic bottle-turning station. The bottles are held in place by rails and their exit is blocked by a stop. Control circuitry detects when the station is filled, causes the infeed conveyor to stop delivering bottles to the station, and causes the station to rotate laterally by 90 degrees. The bottles are now on their sides. The stop is lowered and the bottles are carried from the station on an outfeed conveyor. When the station is emptied, control circuitry reactuates the stop and restarts bottle delivery from the infeed conveyor.

The cycle then repeats.

DETAILED DESCRIPTION OF PREFERRED EMBODIMENT

Figure 1:
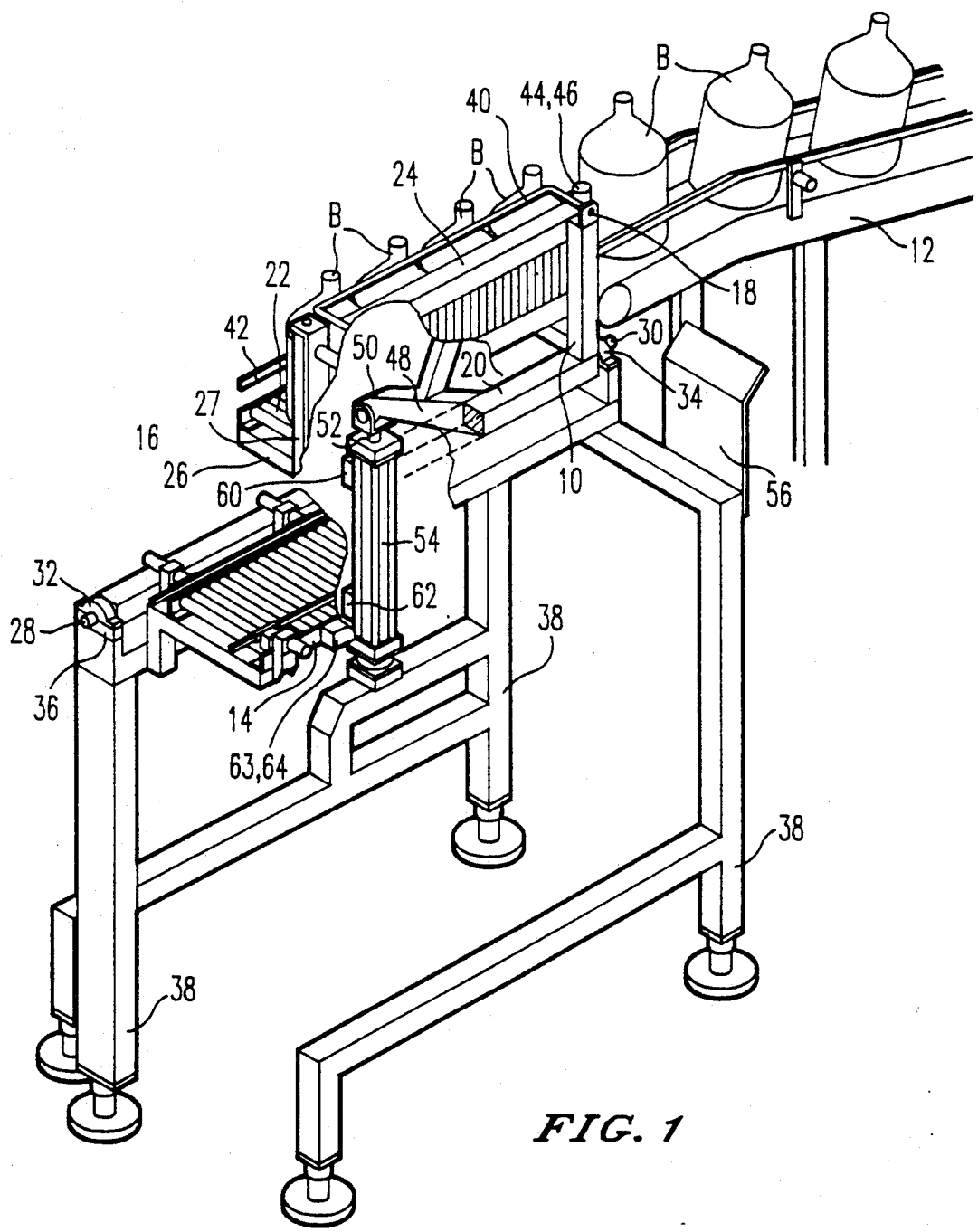
FIG. 1 is a perspective view of the automatic bottle-turning machine, showing upright bottles being conveyed into it. In this view, the machine is in its configuration before it has turned the bottles.
Figure 2:
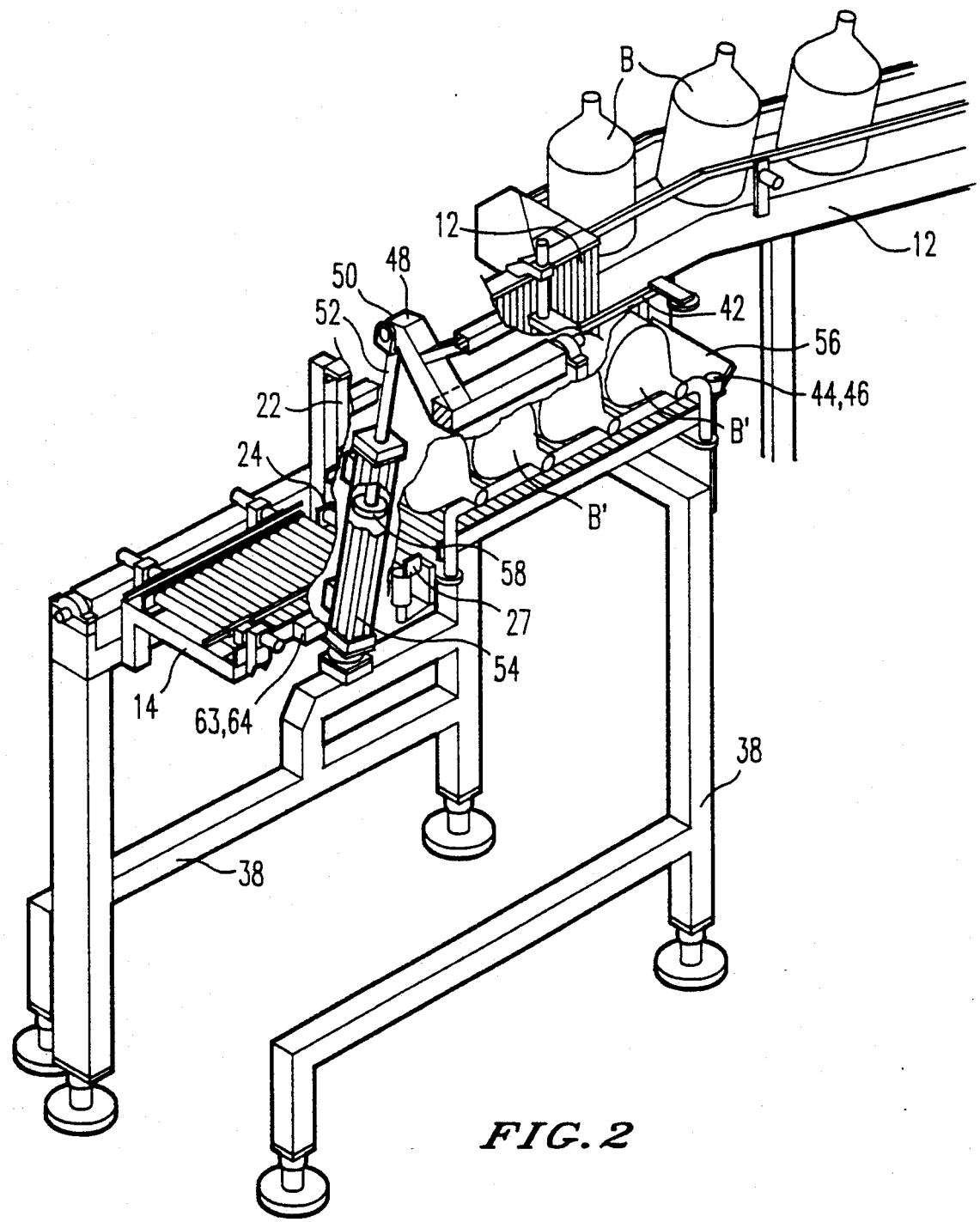
FIG. 2 is a perspective view of the automatic bottle-turning machine, showing bottles having been turned on their sides by it and about to be conveyed away from it on their sides. In this view, the machine is in its configuration after it has turned the bottles onto their sides.

Referring to FIG. 1, it is seen that upright filled bottles B are conveyed to automatic bottle-turning machine 10 by a powered infeed conveyor 12. As shown in FIG. 2, turned bottles B' are conveyed on their sides away from machine 10 by an outfeed conveyor 14.

Bottle-turning station

Powered infeed conveyor 12 intermittently delivers upright bottles B to a bottle-turning station 16 via an entry side 18 of station 16. Ordinarily, conveyor 12 delivers upright bottles from floor level to a height of approximately 5 feet, because station 16 is at that height. In this configuration, conveyor 12 has an ascending gradient of approximately 20 to 30 degrees, and therefore conveyor 12 may use up 10 to 15 feet of floor space. In order to conserve space, the system may be configured with an elevator that replaces or permits shortening of conveyor 12.

Bottle-turning station 16 is basically L-shaped, as viewed from a vantage point of entry side 18 and infeed conveyor 12. Station 16 comprises a pivoted station frame 20, to which are mounted a first roller conveyor 22 and a second roller conveyor 24, where first conveyor 22 is the base of the L-shape and second conveyor 24 is the vertical stem of the L.

Conveyors 22 and 24 extend longitudinally approximately 4 feet from entry side 18 of station 16 to a distal side 26 of station 16. The rollers of conveyors 22 and 24 extend laterally and vertically, respectively, for approximately 14 inches. Frame 20 of bottle-turning station 16 is set up so that it slopes downward from entry side 18 to distal side 26 at a gradient of approximately 8 to 10 degrees. This permits conveyors 22 and 24 to be unpowered, gravity conveyors.

Station frame 20 is also generally L-shaped in cross-section. The two sides of the L are each about 16 to 20 inches, and frame 20 extends approximately 4 feet longitudinally from entry side 18 of station 16 to distal side 26. At the part of frame 20's L-shape where the two sides of the L meet, a longitudinal shaft 28 is mounted to frame 20. Shaft 28 has a proximate end 30 at entry side 18, and a distal end 32 at distal side 26, and is approximately 4 feet long.

Ends 30 and 32 of shaft 28 are mounted in proximate and distal bearings 34 and 36, respectively. Bearings 34 and 36 are mounted on a main frame 38. Thus, frame 20 can rotate relative to main frame 38, permitting bottle-turning station 16 to rotate from an upright-L position to a rotated-L position in which the L is laterally turned 90 degrees to the left (_|), as viewed from entry side 18 of station 16.

Initial configuration of bottle-turning station

Station 16 is designed to contain a line of four bottles B at a time, each bottle B being approximately 1 foot in diameter and 2 feet in height. (However, the apparatus can readily be adapted to a different number or size of bottles by expedients that will be obvious to persons skilled in this art. Four bottles is a convenient number to turn at a time, because that is the number of bottles that extend across the width of the shelf of a type of bottle rack common in the northeastern United States and in Canada.)

Four upright bottles B are delivered via entry side 18 onto first conveyor 22, a small roller conveyor which acts as a floor of bottle-turning station 16 and as a continuation of powered conveyor 12. As shown in FIG. 1, when four upright bottles B are first loaded into station 16, they form a line 4 feet long, extending from entry side 18 to distal side 26. Distal side 26 of station 16 is blocked by a distal stop 28, so that bottles B cannot get past stop 28. Stop 28 blocks the distal side of station 16 by obstructing both conveyors 22 and 24 at their distal ends.

A neck rail 40 affixed to station frame 20 by a bracket or other support runs longitudinally along the top side of conveyor 24, and extends laterally inward like the right part of the upper serif of an L, as viewed from entry side 18. Neck rail 40 runs longitudinally from entry side 18 to distal side 26 of station 16, and is spaced about 3 or 4 inches from the plane of conveyor 24, so that rail 40 engages against the necks or shoulders of the bottles in station 16 when their sides press against the rollers of conveyor 24. It is not necessary that rail 40 actually press against the necks or shoulders of the bottles, however, for the purpose of rail 40 is mainly just to keep the bottles from shooting out of the unit to the left when station 16 rotates 90 degrees to the left to turn the bottles onto their sides.

A side rail 42 affixed to station frame 20 by a bracket or other support runs longitudinally along the open side of conveyor 22 (the right side of the L) from entry side 18 to distal side 26. Side rail 42 is about 6 to 10 inches above the rollers of conveyor 22, and extends laterally inward toward the stem of the L, so that rail 42 keeps the bottles in station 16 from being pushed over the right side of conveyor 22 during loading.

Rotation of bottle-turning station

As upright bottles B go through entry side 18 of bottle-turning station 16, they pass a photoelectric detector 44 which sends a signal to a counter 46. Detector 44 may be replaced by a microswich and "whisker" triggered by physical contact with a bottle B passing it, or with a proximity switch.

When four bottles (or any other desired predetermined number) have filled station 16, counter 46 sends a full-station control signal to initiate rotation of bottle-turning station 16. First, powered infeed conveyor 12 is deactuated, so that no more bottles B are delivered to station 16. The inventor has not found it necessary to include also a powered entry stop or other similar barrier to prevent further bottles B from entering station 16 after power is taken from powered infeed conveyor 12. The fact that conveyor 12 has an ascending gradient is sufficient. In some applications, however, use of an entry stop may be indicated, so that in such a case it, too, will have to be actuated by the full-station control signal.

Figure 3:
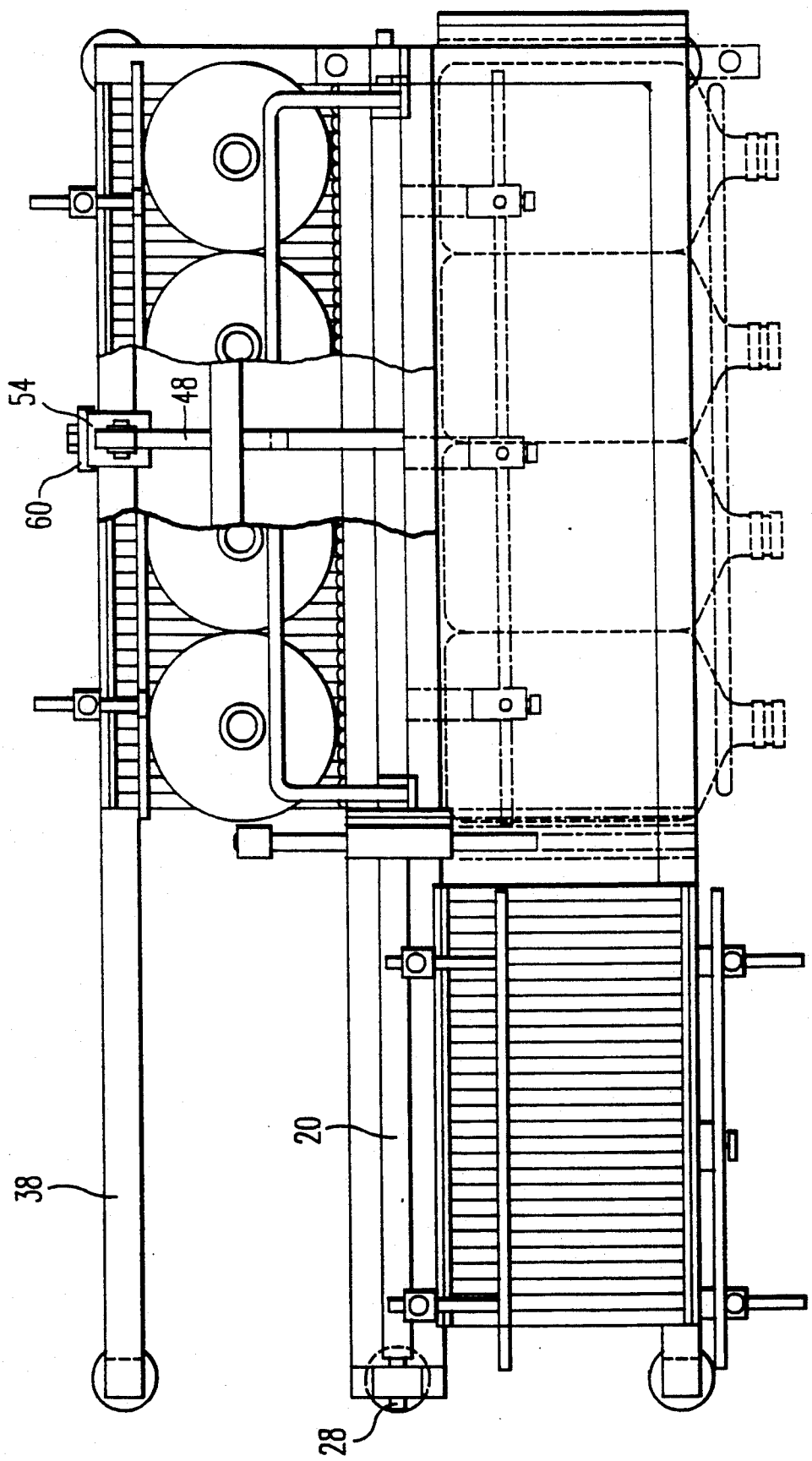
FIG. 3 is a plan view of the mechanism for rotating the bottle-turning station.

As shown in FIG. 3, station frame 20, which is pivotally mounted to main frame 38, has as an integral part an arm member 48. Arm member 48 has an outer end 50, which is pivotally connected to piston arm 52, so that arm member 48 and piston arm 52 can move in a vertical plane, thereby rotating station frame 20 around shaft 28. Piston arm 52 slides in and out of a pneumatic piston unit 54. Piston unit 54 has valves at each end of its cylinder, so that it can be reciprocated. When piston arm 52 is in its normal, rest position (here full-down), frame 20 has its initial L-shape configuration, as shown in FIG. 1. When piston arm 52 is fully raised out of piston unit 54, the L is rotated 90 degrees to the left (as viewed from entry side 18 of bottle-turning station 16), as shown in FIG. 2. Piston unit 54 can be hydraulic instead of pneumatic. A motor-driven chain-belt unit, preferably including reduction gears, is another alternative expedient. The selection of length of lever arms (i.e., arms 48 and 52) and placement of pivot points deserve some care, because the station weighs approximately 150 to 200 pounds, and four filled water bottles contribute another 180 pounds to it. However, such design is within the ability of those having ordinary skill in this art without undue experimentation.

Exit of bottles from station

As shown in FIG. 2, when bottle-turning station 16 rotates 90 degrees, the axes of the rollers of second conveyor 24 become horizontal and extend laterally across station 16. Conveyor 24 becomes the floor of station 16, instead of conveyor 22, whose axes are now oriented vertically. Formerly upright bottles B are now horizontal bottles B' resting on their sides on conveyor 24. Neck rail 40 keeps bottles B' from falling off the outer edge of conveyor 24.

When thus rotated 90 degrees to the left, station frame 20 rests on a portion of main frame 38, relieving any strain on piston unit 54, and insuring correct registration between second conveyor 24 and exit conveyor 14. In this configuration, a proximate stop 56, mounted to main frame 38, blocks possible slippage of any bottles B' out entry side 18 of station 16. Also, bottles B' cannot roll down and out of station 16, even though conveyor 24 has a downward gradient of 8 to 10 degrees in that direction, because distal stop 28 still blocks any exit of bottles.

Piston arm 52 is equipped with a magnetic element 58, which moves up and down with arm 52. Magnetic reed switches 60 and 62 are located in proximity to the maximum upper and lower positions, respectively, of element 58. When arm 52 is in its full-up position, magnetic element 58 actuates switch 60, which then sends to control circuitry a station-turned signal causing distal stop 28 to be retracted. That permits bottles B' to roll out of conveyor 24 onto outfeed conveyor 14, thus exiting bottle-turning station 16.

Magnetic element 58, and reed switches 60 and 62, may be replaced by alternative means for indicating that station 16 is in its first or second configuration. Photoelectric detectors are advantageously used for this purpose, as are microswitches or limit switches actuated by contact with frame 20 or with an arm ("dog") attached thereto. Capacitive proximity switches may also be utilized, and magnetic elements and reed switches may be placed on other parts of the machine for accomplishing the same function.

Return of station to initial configuration

As bottles B' exit station 16, they pass photoelectric detector 62, which sends signals to a counter 64. When counter 64 reaches a count of four (or whatever is the predetermined number of bottles that station 16 is intended to contain at one time), it sends a station-empty signal to control circuitry, thereby actuating piston unit 54 in the reverse direction.

Piston unit 54 then withdraws piston arm 52, rotating station 16 back to its initial configuration of an upright L. When station frame 20 has rotated 90 degrees to the right, station frame 20 rests on a portion of main frame 38, relieving any strain on piston unit 54, and insuring correct registration between first conveyor 22 and powered entry conveyor 12.

When piston arm 52 is in its full-down position, reed switch 62 sends a station-returned signal that (1) causes distal stop 28 to be actuated, obstructing exit of bottles B from station 16; and (2) causes powered infeed conveyor 12 to be reactuated, bringing additional bottles B to station 16. The cycle now recommences.

Concluding remarks

While the invention has been described primarily in connection with specific and preferred embodiments thereof, it will be understood that it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made.

For example, the preferred embodiment of this invention has been described as comprising two roller conveyors in a L-shaped orientation. The invention may be carried out, albeit not in the inventor's preferred manner, by substituting smooth sheet metal surfaces for the roller conveyors, or other appropriate planar supports. Additionally, the preferred embodiment of this invention has been described as utilizing two longitudinal rails to hold the bottles in place, so that they do not fall off the outer edges of the station. The invention may be carried out, albeit not in the inventor's preferred manner, by other methods of holding the bottles in place. Further, the distal stop can rise out of and retract into the plane of either the first or second conveyor. Also, its function can be accomplished by substituting for it a 45-degree triangular plane which obstructs the central portion of the L (i.e., where the inner edges of the conveyors approach one another) at the distal end of the station, and which hinges down in a distal direction in lieu of retracting.

As used in the claims, the proximate end of the station and portions thereof is the infeed end (entry side); the distal end of the station and portions thereof is the outfeed end (exit side). The support members are the two small roller conveyors (or other appropriate planar supports) which are in an L-shaped orientation. The inner edges of the support members are the part of the L-shape where the base and stem of the L come together; the outer edges of the support members are the other edges (where the rails are located).

The subject matter claimed is:

1. An automatic bottle-turning system for turning upright bottles onto their sides, said system comprising:
    a bottle-turning station having a longitudinal axis, said station being laterally rotatable about said longitudinal axis;
    said station comprising a first support member and a second support member, said support members —
      being generally planar;
      having inner and outer edges running parallel to said longitudinal axis of said station;
      being adjacent to one another along said inner edges; and
      being disposed at a right angle to one another along said inner edges;
    said station and said support members having proximate and distal ends;
    rotation means for laterally rotating said station about said longitudinal axis, between an initial position in which said first support member is horizontal and said second support member is vertical, and a final position in which said first support member is vertical and said second support member is horizontal;
    means for sending a full-station control signal when a predetermined number of bottles have entered said station onto said first support member;
    means for receiving said full-station control signal and thereupon actuating said rotation means to rotate said station from said initial position to said final position;
    means for sending a station-turned control signal when said station has reached said final position;
    means for receiving said station-turned signal and thereupon discharging said bottles from said second support member via said distal end thereof;
    means for sending a station-empty signal when said predetermined number of bottles have exited via said distal end; and
    means for receiving said station-empty signal and thereupon actuating said rotation means to rotate said station from said final position to said initial position.

2. The system of claim 1 further comprising:
    infeed means for delivering upright bottles to said station at said proximate end thereof; and
    means for deactuating said infeed means after a full-station signal has been received, thereby stopping delivery of bottles to said station.

3. The system of claim 2 further comprising:
    means for sending a station-return signal when said station has reached said initial position after rotating thereto from said final position; and
    means for reactuating said infeed means after said station-return signal has been received.

4. The system of claim 1 further comprising:
    distal stopping means, located at said distal end of said station, for preventing bottles from passing beyond said distal end of said station and exiting therefrom;
    means for deactuating said distal stopping means after said station-turned control signal is received.

5. The system of claim 4 further comprising means for reactuating said distal stopping means after said predetermined number of bottles have exited via said distal end.

6. The system of claim 1 wherein said first and second support members are roller conveyors.

7. An automatic bottle-turning machine for automatically turning upright bottles onto their sides, said machine comprising:
a main frame;
a bottle-turning station frame having a longitudinal axis and rotatably mounted thereabout to said main frame;
mounted to said bottle-turning station frame, a first conveyor and a second conveyor, said conveyors having inner edges and outer edges running parallel to said longitudinal axis; and
being disposed at right angles to one another along said inner edges;
a rotation unit for rotating said bottle-turning station frame clockwise and counterclockwise about said axis between a first station position and a second station position;
said first station position being one in which said first conveyor is in a horizontal plane; and
said second station position being one in which said second conveyor is in a horizontal plane.

8. A machine according to claim 7 further comprising a lever arm affixed to said bottle-turning station frame and projecting therefrom, said lever arm having a distal end, distal from said frame, said lever arm being located generally in a plane perpendicular to said longitudinal axis; and wherein said rotation unit comprises:
a powered piston unit mounted to said main frame;
said piston unit having a piston arm that reciprocates into and out of said unit when said unit is actuated;
said piston arm having an outer end pivotally connected to said distal end of said lever arm, whereby reciprocal motion of said piston arm rotates said bottle-turning station frame clockwise and counterclockwise about said shaft between said first station position and said second station position.

9. A machine according to claim 7, said machine and said first conveyor having an entry end, and said machine and said second conveyor having an exit end, said machine further comprising:
a first counter/controller that counts bottles that enter said entry end and, upon reaching a predetermined count number, causes actuation of said rotation unit to rotate said bottle-turning station from said first station position to said second station position; and
a second counter/controller that counts bottles that exit said exit end and, upon reaching said predetermined count number, causes actuation of said rotation unit to rotate said bottle-turning station from said second station position to said first station position.

10. A machine according to claim 7, said machine having an exit end, said machine further comprising:

a retractable exit stop for preventing bottles from exiting said first and second conveyors via said exit end until said exit stop is retracted; and
a controller for retracting said exit stop only when a predetermined one of said first and second conveyors is in a horizontal plane.

11. A machine according to claim 10 further comprising a controller for extending said retractable exit stop after a predetermined number of bottles has exited said predetermined one of said first and second conveyors.

12. The automatic bottle-turning machine of claim 7 further comprising:
a first lateral support running parallel to said longitudinal axis, located near said outer edge of said first conveyor, and adapted to prevent bottles from falling over said outer edge when said conveyor is in a horizontal plane; and
a second lateral support running parallel to said longitudinal axis, located near said outer edge of said second conveyor, and adapted to prevent bottles from falling over said outer edge when said conveyor is in a horizontal plane.

13. A method for automatically turning upright bottles onto their sides, comprising:
(1) automatically delivering a series of upright bottles to a first surface of a turning station via an entry end thereof, said station having a retractable exit stop at a further end thereof that is longitudinal spaced from said entry end, whereby said bottles are longitudinally disposed in a line on said surface of said station, said exit stop blocking exit of bottles from said station;
(2) automatically counting the bottles entering said station via said entry end and, when a predetermined count number is reached, automatically generating a filled-station control signal actuating circuitry that stops delivery of additional bottles to said station and rotates said station laterally about a longitudinal axis thereof from an initial position thereof to a final position thereof in which said line of bottles are on their sides on a second surface of said station;
(3) when said station has completed lateral rotation to said final position, automatically generating a rotation-completed signal actuating circuitry that automatically retracts said retractable exit stop, automatically discharging said bottles from said station from said further end thereof; and
(4) automatically counting the bottles discharged from said station and, when said predetermined count number is reached, automatically generating a station-empty control signal actuating circuitry that reverse-rotates said station laterally about said axis to said initial position and reactuates said retractable exit stop blocking exit of bottles from said station.

* * * * *